(12) United States Patent
Hayward et al.

(10) Patent No.: US 6,999,189 B2
(45) Date of Patent: Feb. 14, 2006

(54) WORK STATION HAVING A REDUCTION/ENLARGEMENT FINE TUNING FEATURE

(75) Inventors: Ken Hayward, Brockport, NY (US); Marc J. Krolczyk, Rochester, NY (US); Dawn M. Marchionda, Marion, NY (US)

(73) Assignee: Xerox Corporation, Stamford, CT (US)

( * ) Notice: Subject to any disclaimer, the term of this patent is extended or adjusted under 35 U.S.C. 154(b) by 923 days.

(21) Appl. No.: 09/736,704

(22) Filed: Dec. 15, 2000

(65) Prior Publication Data

US 2002/0075487 A1 Jun. 20, 2002

(51) Int. Cl.
*G06K 15/02* (2006.01)
*G06F 13/00* (2006.01)
(52) U.S. Cl. ............... 358/1.15; 358/1.13; 358/1.9
(58) Field of Classification Search ............... 358/1.15, 358/1.14, 1.13, 1.9, 1.16, 537, 527
See application file for complete search history.

(56) References Cited

U.S. PATENT DOCUMENTS 6,704,122 B1 * 3/2004 Moro et al. ............... 358/1.9

* cited by examiner

*Primary Examiner*—Douglas Q. Tran
(74) *Attorney, Agent, or Firm*—Tallam I. Nguti (57) ABSTRACT

A reprographic system is provided and includes a digital multi-function reprographic machine for reproducing copies of original images and a programmed personal computer (PC) subsystem. The programmed personal computer (PC) subsystem is connected to the multi-function reprographic machine for processing and controlling original images to be reproduced by the multi-function reprographic machine, and includes a work station monitor having a user screen, a machine-client dialog box, and a drop-down reduction/enlargement (R/E) window. The drop-down reduction/enlargement (R/E) window includes a drop-down arrow, a value display area, selectable preset major R/E values, and increasing-value and decreasing-value fine tuning devices for efficiently and quickly varying a selected selectable preset major R/E value for controlling an original image processed by the PC subsystem and being reproduced by the multi-function reprographic machine.

20 Claims, 6 Drawing Sheets

R/E Reduction / Enlargement
DNMV Defined Nearest Major Value
FTA Fine Tuning Arrows
DFTV Desired Fine Tuned Value

WORK STATION HAVING A REDUCTION/ENLARGEMENT FINE TUNING FEATURE

BACKGROUND OF THE INVENTION

The present invention is directed to reprographic systems including a personal computer (PC) work station connected to a copier or multifunction machine, and more particularly to such a PC work station having a reduction/enlargement (R/E) fine tuning feature.

A conventional reprographic machine is the office copier. Traditionally, the copier, in the office equipment context, refers to a light lens xerographic copier in which paper originals are in fact photographed. The images are focused on an area of a photoreceptor, which is subsequently developed with toner. The developed image on the photoreceptor is then transferred to a copy sheet which in turn is used to create a permanent copy of the original.

In recent years, however, there has been made available what is known as digital copiers or printing machines. In the most basic functions, a digital copier or printing machine performs the same functions as a light lens copier, except that the original image to be copied is not directly focused on a photoreceptor. Instead, with a digital copier or printer, the original image is received from a personal computer (PC) work station, or is scanned by a device generally known as a raster input scanner (RIS) which is typically in the form of a linear array of small photosensors.

The original image is focused on the photosensors in the RIS. The photosensors convert the various light and dark areas of the original image to a set of digital signals. These digital signals are temporarily retained in a memory and then eventually used to operate the digital printing machine or copier when it is desired to print copies of the original. The digital signals may also be sent directly to the digital printing machine or copier without being stored in a memory.

Moreover, with the advent of the digitalization of the office copier, there has also been made available digital multi-function machines. The digital multi-function machine is a single machine which provides a user with more than one function. An example of a typical multi-function machine would include a digital facsimile function, a digital printing function, and a digital copy function.

More specifically, a user can utilize this digital multi-function machine to send a facsimile of an original document to a remote receiving device, to scan in an original image and print copies thereof, and/or to print documents from either a locally connected source, or from a portable memory device which has been inserted into the multi-function machine.

SUMMARY OF THE PRESENT INVENTION

In accordance with the present invention, there is provided a reprographic system that includes a digital multi-function reprographic machine for reproducing copies of original images and a programmed personal computer (PC) subsystem. The programmed personal computer (PC) subsystem is connected to the multi-function reprographic machine for processing and controlling original images to be reproduced by the multi-function reprographic machine, and includes a work station monitor having a user screen, a machine-client dialog box, and a drop-down reduction/enlargement (R/E) window. The drop-down reduction/enlargement (R/E) window includes a drop-down arrow, a value display area, selectable preset major R/E values, and increasing-value and decreasing-value fine tuning devices for efficiently and quickly varying a selected selectable preset major R/E value for controlling an original image processed by the PC subsystem and being reproduced by the multi-function reprographic machine.

Further objects and advantages of the present invention will become apparent from the following description of the various features of the present invention.

BRIEF DESCRIPTION OF THE DRAWINGS

The following is a brief description of the drawings used to describe the present invention, and thus, these drawings are being presented for illustrative purposes only and thus should not limit the scope of the present invention, wherein.

DETAILED DESCRIPTION OF THE PRESENT INVENTION

The following is a detailed description of the present invention. In this description, the drawings have been utilized to illustrate the concepts of the present invention. In this description as well as in the drawings, like reference numerals indicate the same items or equivalent items.

Figure 1:
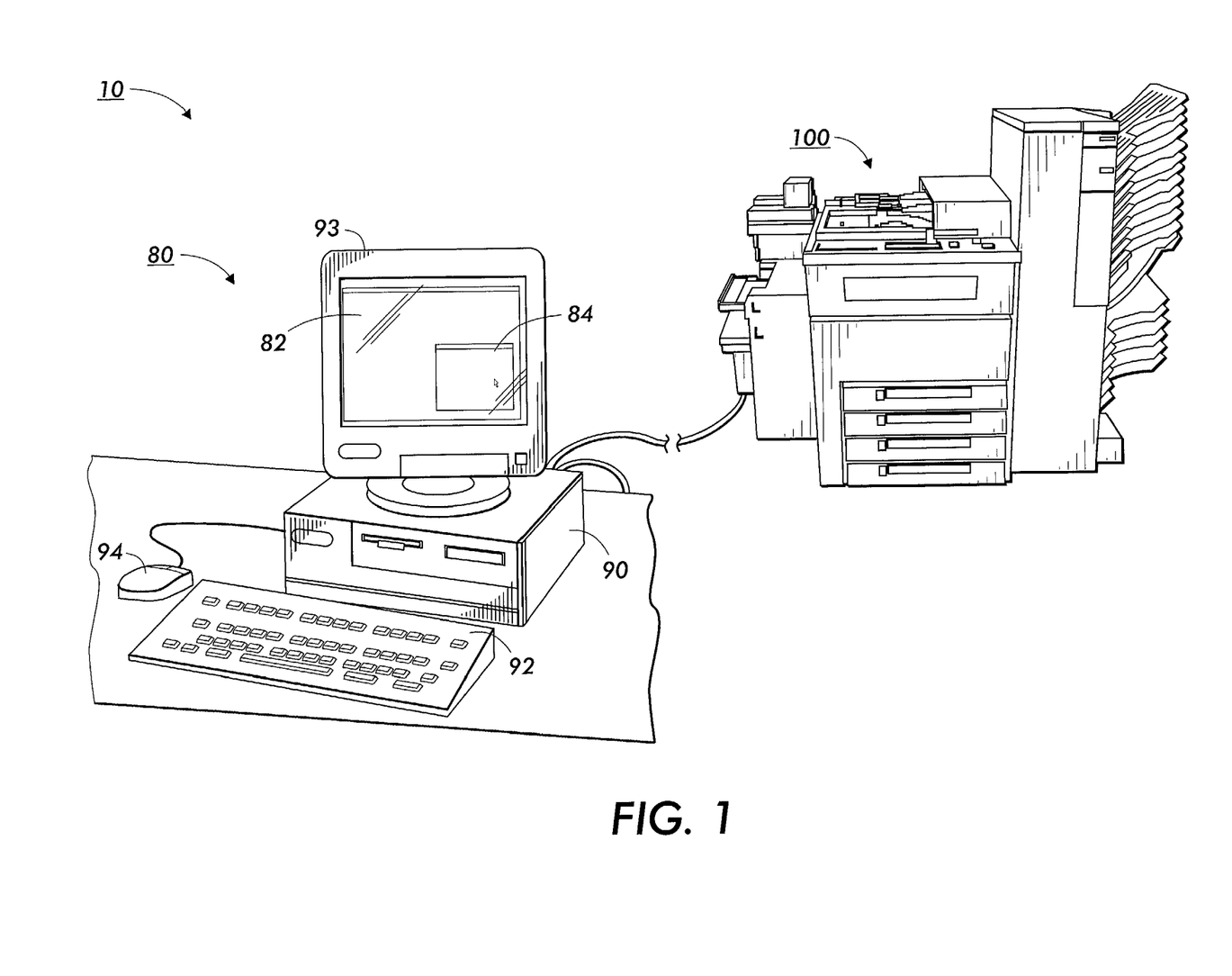
FIG. 1 is a graphic representation of a networked digital reprographic system including the reduction/enlargement fine tuning feature of the PC work station client of the present invention.

FIG. 1 is a graphic representation of a networked digital reprographic system 10 including a digital multi-function reprographic machine 100 connected to a personal computer (PC) work station 80. As shown, the PC work station 80 includes a computer monitor 93 having a screen 82, and a PC client 84 (including the reduction/enlargement fine tuning feature of the present invention (to be described in detail below)) for programming and controlling functions of the digital, multi-function reprographic machine 100 from the work station 80. The work station 80 also includes a central processing unit (CPU) 90, a keyboard 92, and mouse 94. The keyboard and mouse are connected to the CPU 90 as is well known.

Figure 2:
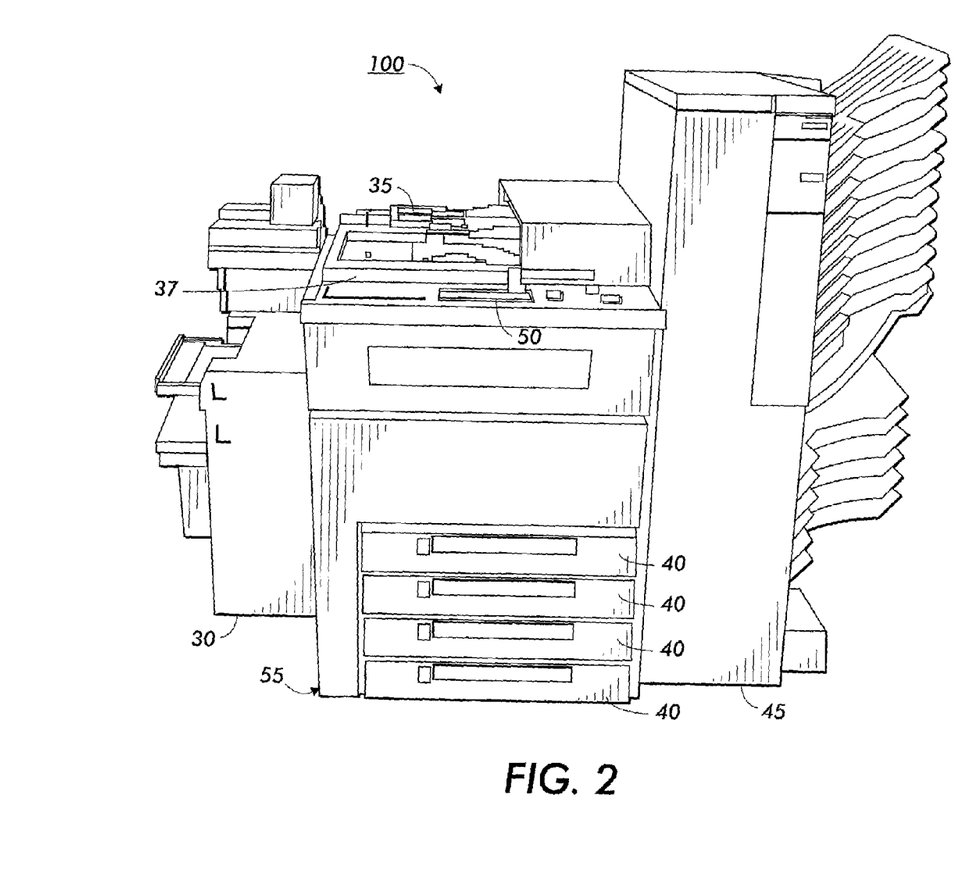
FIG. 2 is an illustration of a multi-function reprographic machine having a PC client (at the PC workstation of FIG. 1) including the reduction/enlargement fine tuning feature of the present invention.
Figure 3:
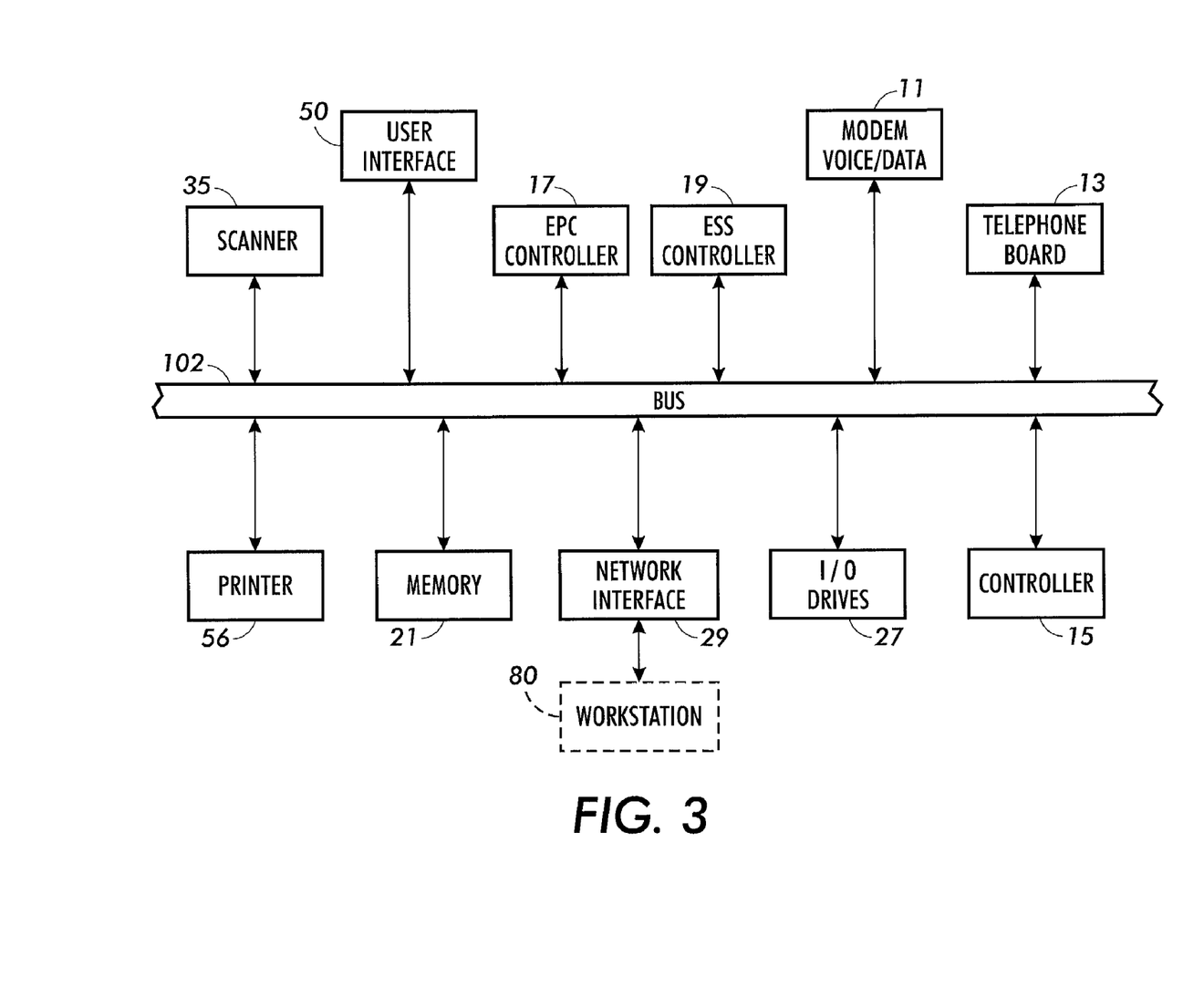
FIG. 3 is a block diagram illustration of the multi-function reprographic machine of FIG. 2.

Referring now to FIGS. 1–3, an overall construction and block diagram of the digital multi-function reprographic machine 100 are illustrated. As shown, the digital multi-function machine 100 includes a scanning station 35, a printing station 55, and a machine user interface (MUI) 50. The digital multi-function machine 100 may also include a finisher device 45 which may be a sorter, tower mailbox or stapler. The printing station 55 may include a plurality of paper trays 40 that store paper used in the printing process.

Lastly, the digital multi-function machine may include a high capacity feeder 30 which is capable of holding large amounts of paper stock to be used by the machine.

In a typical scanning function, the operator would utilize the scanning station 30 to scan in the images from the original documents. This scanning station 30 may be a platen type scanner or may include a constant velocity transport system which moves the original documents across a stationary scanning device. Moreover, the scanning station 30 may also include a document handling system which is capable of placing the original documents, automatically, on the glass platen for scanning.

With respect to the printing functions, the printing station 55 would retrieve the proper paper from one of the multiple paper trays or the high capacity feeder, render the desired image on the retrieved paper, and output the printed image to the finishing device 45 for further operations.

The machine user interface 50 allows the user to control, at the machine, various functions of the digital multi-function machine by presenting various types of screens to the user which provide the user an opportunity to program certain job characteristics or function characteristics.

An example of the basic architecture of the digital multi-function machine 100 is illustrated in FIG. 3, and includes the scanner 35 which converts an original image into a set of digital signals that can be either stored or reproduced. The scanner 35 is connected to a central bus system 102 which may be either a single bus or a plurality of buses which provide interconnections and intercommunications between the various modules and devices on a multi-function digital machine.

The digital multi-function machine 100 also includes a digital printing device 56 of the printing station 55 (FIG. 2) which converts digital signals representing an image into a hardcopy of that image on a recording medium whether the recording medium be paper, transparency, or other type of markable medium. A memory 21 is provided for storing a variety of types of digital information such as machine fault information, machine history information, digital images to be processed at a later time, instruction sets for the machine or job instruction sets.

The digital multi-function machine 100 further includes an electronic pre-collation memory section 17 which may store the digital representation of the image being presently rendered by the digital printing device 56. In the electronic pre-collation memory 17, the digital image is already laid out in its page structure so that it can be readily rendered by the digital printing device 56.

Since the digital multi-function machine 100 is connected to the network 10 and the PC work station 80 (FIG. 1), it includes a network interface 29 and an electronic subsystem (ESS) controller 19 which control the interrelationship between the various modules or devices on the digital multi-function machine 100 and the network 10.

To enable a facsimile function, the digital multi-function machine 100 would include, typically, a voice/data modem 11 and a telephone circuit board 13. Moreover, the digital multi-function machine may include input/output drives 27 such as a floppy disc drive, a CD ROM drive, a tape drive, or other type of drive which can accept a portable memory device.

In some digital multi-function machines, the machine also includes a finisher 45 which can perform certain operations upon the printed output from the printing device 56. Lastly, the digital multi-function machine includes a controller 15 which controls all the functions within the multi-function device so as to coordinate all the interactions between the various modules and devices.

Figure 4:
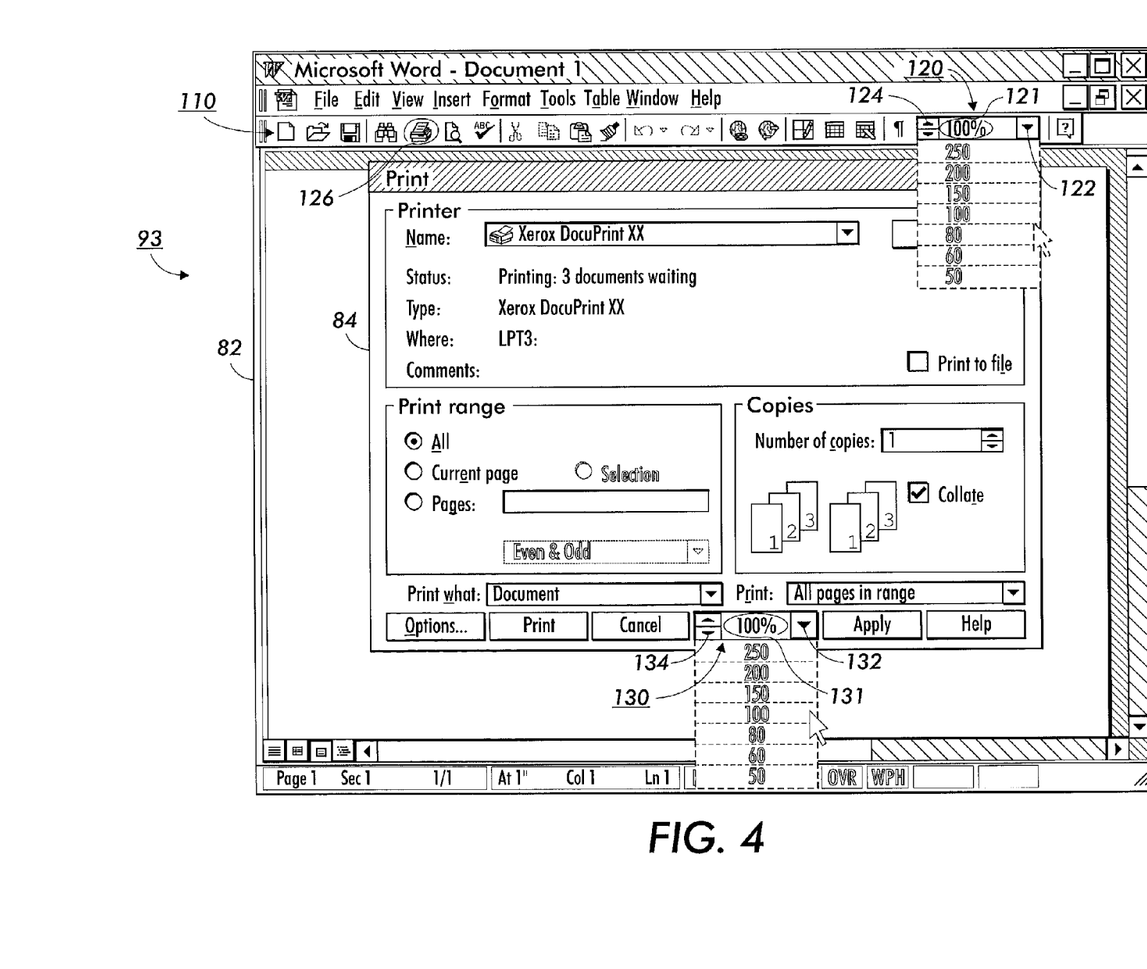
FIG. 4 is an illustration of a PC screen including the PC machine-client and the reduction/enlargement fine tuning features of the present invention.

Referring now to FIG. 4, the computer monitor 93 of the work station 80 is illustrated in FIG. 4. As shown therein, the monitor screen 82 includes a tool bar 110 and a reduction/enlargement (R/E) or zoom drop-down window 120 that features a value display area 121, a drop-down arrow 122 and fine-tuning means such as up and down arrows 124. Additionally, the screen 82 shows a machine-client dialog box or screen 84 that is displayable by selecting for example the print tool 126 within the tool bar 110. In addition to displaying conventional reprographic machine programmable functions within the client screen or dialog box 84, a reduction/enlargement (R/E) drop-down window 130 that features a value display area 131, a drop-down arrow 132 and fine-tuning means such as up and down arrows 134.

Figure 5:
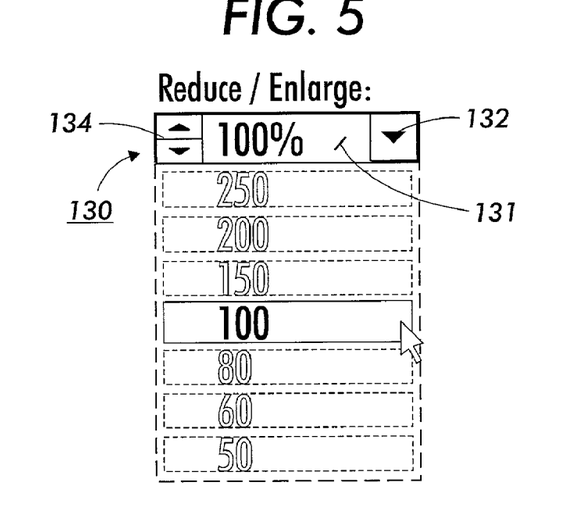
FIG. 5 is an illustration of a right-handed PC client reduction/enlargement drop-down window with fine tuning feature of the present invention.
Figure 6:
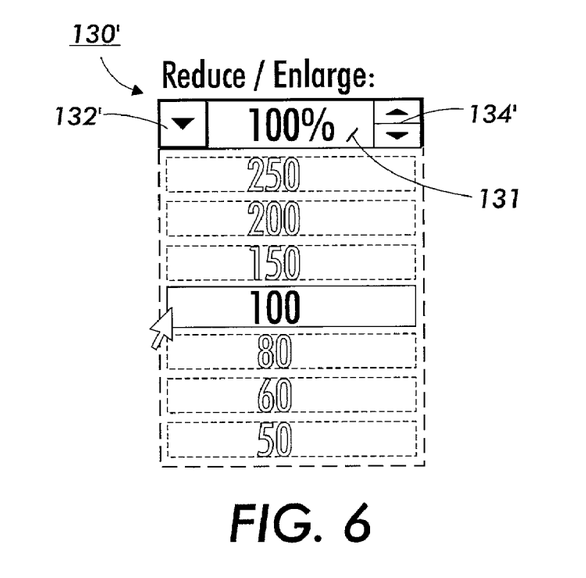
FIG. 6 is a an illustration of a left-handed PC client reduction/enlargement drop-down window with fine tuning feature of the present invention.
Figure 7:
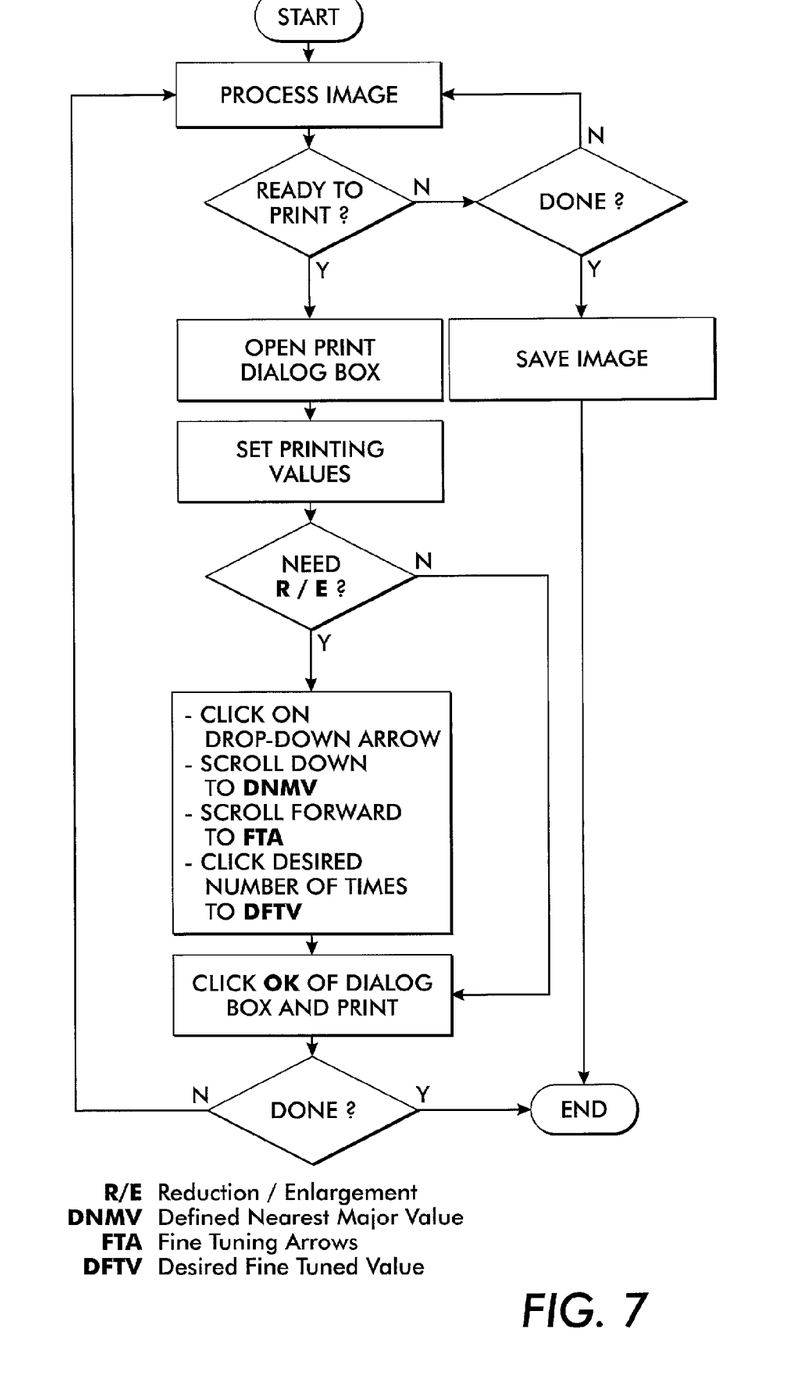
FIG. 7 is a flow chart illustration of the reduction/enlargement fine tuning feature of the present invention.

FIG. 5 is an illustration of a right-handed PC based machine-client reduction/enlargement drop-down window, for example, 130 with the fine tuning feature 134 of the present invention, and FIG. 6 is an illustration of a left-handed PC based machine-client reduction/enlargement drop-down window, for example, 130' with the fine tuning feature 134' of the present invention. FIG. 7 is a flow chart illustration of the reduction/enlargement fine tuning process in accordance with the present invention.

Thus, the PC subsystem or work station 80 includes a work station monitor 93 having a user screen 82, a reprographic machine-client dialog box 84, and a drop-down reduction/enlargement (R/E) window 120, 130. As shown, the drop-down reduction/enlargement (R/E) window 120, 130 includes a drop-down arrow 122, 132, a value display area 121, 131, selectable preset major R/E values, for example 250%, 200%, 150%, 100%, 80%, 60%, and 50%. Additionally, the drop-down reduction/enlargement (R/E) window 120, 130 includes increasing-value and decreasing-value fine tuning means 124, 134 for efficiently and quickly varying a selected selectable preset major R/E value for controlling an original image processed by the PC subsystem 80, as well as an original being scanned on the platen 37 for reproduction by the multi-function reprographic machine 100.

In accordance with an aspect of the present invention, for enabling quick and efficient R/E programming and control, from the PC work station 80, of jobs to be produced by the reprographic machine 100, the increasing-value and decreasing-value fine tuning feature 124, 134 and the drop-down arrow 122, 132 are located on opposites ends of the value display area 121, 131 of the drop-down reduction/enlargement (R/E) window 120, 130. The increasing-value and decreasing-value fine tuning feature or means 124, 134 may for example comprise a spin dial having directional pointers, such as the arrows shown. In operation, each single programming click of each of the directional pointers varies, by one percent, a selected preset major R/E value within the display area 121, 131 of the reduction/enlargement (R/E) drop-down window 120, 130.

In other words, in accordance with the present invention, a drop-down window 120, 130 is provided for the reduction/enlargement settings located on the PC work station machine-client dialog box or screen for controlling the R/E functions of the digital multi-function reprographic machine 100. Accordingly, a list of preset major R/E settings or values 250%, 200%, 150%, 100%, 80%, 60%, and 50%. are displayed in the drop-down window from which the user can then fine-tune by clicking up/down arrows 124, 134 or by simply typing a custom value within a value display area 121, 131 of the drop-down window.

This is a unique combination of a drop-down list of preset R/E values and a spin dial fine tuning feature at the machine-client on the user's PC work station. As such, the user can set gross R/E values, from the PC work station, using the PC R/E drop-down window, then fine-tune such value to a specific value either by using the spin controls 124, 134 or by typing the new specific value in the appropriate field. This feature is common on most copy machines, but is currently not available or seen on the PC work station machine-clients or dialog boxes.

For example, in accordance with the present invention a user may desire to merge and reproduce two original document images at the digital multi-function machine 100. After placing the first original image document on the platen 37 of the machine 100, the user now processes at the PC work station 80, at least a second original document image, such as a watermark and a date that are to be merged at the machine 100 with the first original document image. Importantly, the user desires the machine 100 to produce a number of copies of the merged images at a 54% reduction value. While still at the PC work station 80, the user opens the machine-client (copier/printer dialog box 84) and clicks on the R/E drop-down box or window 130 and moves the cursor in a first direction (right-handed users move right-to-left (FIG. 5), and left-handed users move left-to-right (FIG. 6)) in order to select a preset major value of 50%. The user while still moving in such first direction then reaches the fine-tuning arrows 124, 134, and clicks four times on the increasing-value pointer or arrow thereof so as to go from the preset major value 50% to a fine-tuned value 54%. The merged reproduction job at the machine 100 is thus programmed, and the user then clicks on "Start" "PRINT" or "OK" (whichever is used) at the machine-client to start the machine 100 reproducing the merged and reduction job at 54% reduction. The present invention therefore enables and allows device-UI panel-like control of copy jobs from the machine-client 84 of a PC work station 80 by offering a R/E fine-tuning tool 124, 134 at the PC machine-client 84, or from the tool bar of the PC screen 82.

As can be seen, there has been provided a reprographic system that includes a digital multi-function reprographic machine for reproducing copies of original images and a programmed personal computer (PC) subsystem. The programmed personal computer (PC) subsystem is connected to the multi-function reprographic machine for processing and controlling original images to be reproduced by the multi-function reprographic machine, and includes a work station monitor having a user screen, a machine-client dialog box, and a drop-down reduction/enlargement (R/E) window. The drop-down reduction/enlargement (R/E) window includes a drop-down arrow, a value display area, selectable preset major R/E values, and increasing-value and decreasing-value fine tuning devices for efficiently and quickly varying a selected selectable preset major R/E value for controlling an original image processed by the PC subsystem and being reproduced by the multi-function reprographic machine.

While the present invention has been described with reference to various embodiments as described above, it is not confined to the details set forth above, but is intended to cover such modifications or changes as may come within the scope to the attached claims.

What is claimed is:

1. A reprographic system comprising:
   (a) a digital multi-function reprographic machine for reproducing copies of original images; and
   (b) a programmed personal computer (PC) subsystem connected to said multi-function reprographic machine for processing and controlling original images to be reproduced by said multi-function reprographic machine, said PC subsystem including a work station monitor having a user screen and a drop-down reduction/enlargement (RE) window including a drop-down arrow, a value display area, selectable major R/E values, and increasing-value and decreasing-value fine tuning means, different from said drop-down arrow, for efficiently and quickly varying a selected selectable major R/E value for controlling an original image processed by said PC subsystem and being reproduced by said multi-function reprographic machine.

2. The reprographic system of claim 1, wherein said digital multi-function reprographic machine is a multi-function machine.

3. The reprographic system of claim 1, wherein said drop-down R/E window is included within a job printing dialog box.

4. The reprographic system of claim 1, wherein said drop-down R/E window is located within a tool bar of said user screen of said PC work station.

5. The reprographic system of claim 1, wherein said selectable major R/E values include 250%, 200%, 150%, 100%, 80%, 60%, and 50%.

6. The reprographic system of claim 1, wherein said increasing-value and decreasing-value fine tuning means and said drop-down arrow are located on opposite ends of said value display area of said drop-down reduction/enlargement (R/E)window.

7. The reprographic system of claim 1, wherein said increasing-value and decreasing-value fine tuning means comprises a spin dial having directional pointers.

8. The reprographic system of claim 7, wherein said directional pointers are arrows.

9. The reprographic system of claim 7, wherein a programming click of each of said directional pointers varies by one percent a selected major R/E value within said display area of said reduction/enlargement (R/E) drop-down window.

10. A programmed personal computer (PC) subsystem connectable to a multi-function reprographic machine for processing and controlling original images to be reproduced by the multi-function reprographic machine, the PC subsystem including:
    (a) a work station monitor having a user screen;
    (b) a drop-down reduction/enlargement (R/E) window displayable on said user screen;
    (c) a drop-down arrow within said R/E window;
    (d) a value display area within said R/E window;
    (e) a list of selectable major R/E values within said R/E window; and
    (f) increasing-value and decreasing-value fine tuning means within said R/E window, said increasing-value and decreasing-value fine tuning means being separate and different from said drop-down arrow, thereby enabling a user to efficiently and quickly vary a selected selectable major R/E value for controlling an original image processed by said PC subsystem and being reproduced by the multi-function reprographic machine.

11. The PC system of claim 10, wherein said user screen includes a printer dialog box containing said drop-down R/E window.

12. The PC system of claim 10, wherein said digital multi-function PC machine is a multi-function machine.

13. The PC system of claim 10, wherein said drop-down R/E window is included within a job printing dialog box.

14. The PC system of claim 10, wherein said drop-down R/E window is located within a tool bar of said user screen of said PC work station.

15. The PC system of claim 10, wherein said selectable major R/E values include 250%, 200%, 150%, 100%, 80%, 60%, and 50%.

16. The PC system of claim 10, wherein said increasing-value and decreasing-value fine tuning means and said drop-down arrow are located on opposite ends of said value display area of said drop-down reduction/enlargement (R/E) window.

17. The PC system of claim 10, wherein said increasing-value and decreasing-value fine tuning means comprises a spin dial having directional pointers.

18. The PC system of claim 17, wherein said directional pointers are arrows.

19. The PC system of claim 17, wherein a programming click of each of said directional pointers varies by one percent a selected major R/E value within said display area of said reduction/enlargement (R/E) drop-down window.

20. The PC system of claim 17, including an arrow pointer for pointing and clicking on said increasing-value and decreasing-value fine tuning means.

* * * * *